(12) United States Patent
Mulcaire et al.

(10) Patent No.: US 6,764,276 B2
(45) Date of Patent: Jul. 20, 2004

(54) GUIDE VANE ASSEMBLY

(75) Inventors: Thomas G Mulcaire, Derby (GB); Michael T Holdsworth, Coventry (GB); Richard Evans, Derby (GB)

(73) Assignee: Rolls-Royce plc, London (GB)

(*) Notice: Subject to any disclaimer, the term of this patent is extended or adjusted under 35 U.S.C. 154(b) by 42 days.

(21) Appl. No.: 10/201,195

(22) Filed: Jul. 24, 2002

(65) Prior Publication Data

US 2003/0031556 A1 Feb. 13, 2003

(30) Foreign Application Priority Data

Aug. 11, 2001 (GB) .............................................. 0119608

(51) Int. Cl.$^7$ ................................................. F01D 9/04
(52) U.S. Cl. .................... 415/119; 415/173.1; 415/196; 415/200
(58) Field of Search .......................... 415/9, 119, 173.1, 415/173.4, 196, 197, 200

(56) References Cited

U.S. PATENT DOCUMENTS

| | | | |
|---|---|---|---|
| 3,948,346 A | * 4/1976 | Schindler | 181/286 |
| 3,991,849 A | * 11/1976 | Green et al. | 181/296 |
| 4,235,303 A | 11/1980 | Dhoore | |
| 4,710,097 A | * 12/1987 | Tinti | 415/138 |
| 5,160,248 A | * 11/1992 | Clarke | 415/9 |
| 5,259,724 A | 11/1993 | Liston | |
| 5,543,198 A | * 8/1996 | Wilson | 428/116 |

FOREIGN PATENT DOCUMENTS

| | | |
|---|---|---|
| EP | 0 103 260 A | 3/1984 |
| EP | 0 900 920 A | 3/1999 |
| GB | 1 522 558 SP | 8/1978 |
| GB | 2 054 058 A | 2/1981 |
| JP | 2000345997 P | 6/1999 |

* cited by examiner

*Primary Examiner*—Edward K. Look
*Assistant Examiner*—Dwayne J. White
(74) *Attorney, Agent, or Firm*—W. Warren Taltavull; Manelli Denison & Selter PLLC

(57) ABSTRACT

A fan outlet guide vane assembly (36) for a turbofan gas turbine engine (10) comprises a fan casing (32) and a plurality of circumferentially spaced radially extending fan outlet guide vanes (34). The fan outlet guide vanes (34) are secured at their radially outer ends to the fan casing (32). A plurality of panels (40) are secured to the fan casing (32). Each panel (40) is arranged between two adjacent fan outlet guide vanes (34) to define the flow path between the fan outlet guide vanes (34). Each panel (40) comprises a perforated skin (42) and a honeycomb structure (44) to form an acoustic treatment structure. The perforated skin (42) defines the flow path between the fan outlet guide vanes (34). The pressure equalization across the panels (40) minimises the possibility of the panels (40) being removed.

14 Claims, 4 Drawing Sheets

GUIDE VANE ASSEMBLY

The present invention relates to a guide vane assembly for a gas turbine engine and in particular relates to a fan outlet guide vane assembly for a turbofan gas turbine engine.

A fan outlet guide vane of a gas turbine engine currently comprises a plurality of fan outlet guide vanes, a casing and a plurality of panels. The fan outlet guide vanes are circumferentially spaced, are secured at their radially outer ends to the casing and extend radially inwardly from the casing. The panels are secured to the casing. Each panel is arranged between two adjacent fan outlet guide vanes to define the flow path between the fan outlet guide vanes. The panels are secured to the casing by fasteners, for example nuts and radially extending bolts or by an adhesive bond and fasteners.

A problem with the current design is that there is a pressure difference between the radially inner faces and the radially outer faces of the panels, which tends to remove the panels from the casing. Additionally the fan outlet guide vane assembly provides no noise reduction features to minimise noise produced by the turbofan gas turbine engine.

Accordingly the present invention seeks to provide a novel guide vane assembly which reduces, preferably overcomes, the above mentioned problems.

Accordingly the present invention provides a guide vane assembly comprising a casing, a plurality of circumferentially spaced radially extending guide vanes, the guide vanes being secured at their radially outer ends to the casing, a plurality of panels being secured to the casing, each panel being arranged between two adjacent guide vanes to define the flow path between the guide vanes, at least one panel comprising a perforated skin and an acoustic treatment structure, the perforated skin defining the flow path between the guide vanes.

Preferably each panel comprises a perforated skin and an acoustic treatment structure, the perforated skin defining the flow path between the guide vanes.

Preferably the at least one panel is secured to the casing by fasteners or by an adhesive bond and fasteners.

Preferably the perforated skin of the at least one panel comprises a composite material. Preferably the at least one perforated skin comprises a Preferably the acoustic treatment structure comprises a honeycomb structure. Preferably the honeycomb structure comprises a plurality of cells, each cell having eight sides or less.

Preferably the honeycomb structure comprises an aluminium honeycomb, a composite material honeycomb or other suitable honeycomb.

Preferably the guide vanes are secured to the casing by fasteners or by welded joints.

Preferably a flexible seal is arranged between the circumferential edges of the at least one panel and the two adjacent guide vanes to seal the gap between the circumferential edges of the at least one panel and the two adjacent guide vanes.

Preferably the guide vanes are fan outlet guide vanes and the casing is a fan casing.

The perforated skin and the acoustic treatment structure may be integral.

The perforated skin and the acoustic treatment may comprise a composite material or a metal.

The perforated skin and the acoustic treatment may comprise aluminium or glass fibre reinforced nylon.

The acoustic treatment may be provided with drainage apertures to allow water and/or lubricant to flow generally axially and to prevent water and/or lubricant flowing generally circumferentially between the panel and the casing between the two adjacent guide vanes.

The present invention will be more fully described by way of example with reference to the accompanying drawings in which.

Figure 1:
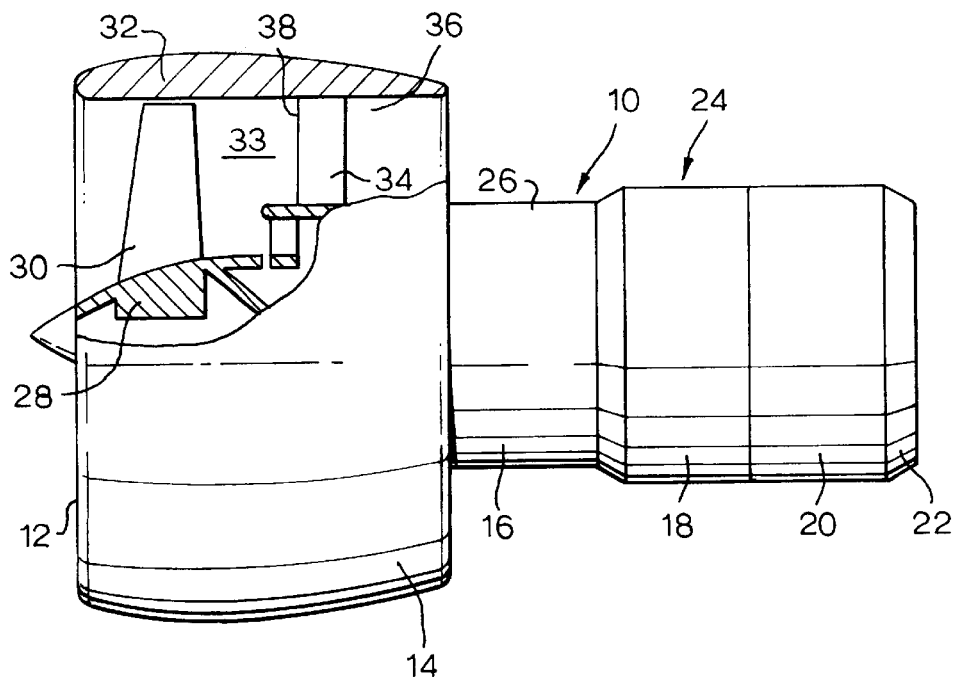
FIG. 1 shows a turbofan gas turbine engine having a guide vane assembly according to the present invention.

A turbofan gas turbine engine 10, as shown in FIG. 1, comprises in flow series an inlet 12, a fan section 14, a compressor section 16, a combustion section 18, a turbine section 20 and an exhaust 22. The turbine section 20 comprises one or more turbines arranged to drive one or more compressors in the compressor section 16 via one or more shafts (not shown). The turbine section 20 comprises one or more turbines arranged to drive the fan section 14 via a shaft (not shown).

The compressor section 16, combustion section 18 and the turbine section 20 form a core engine 24 of the turbofan gas turbine engine 10. The core engine 24 has a core engine casing 26.

The fan section 14 comprises a fan rotor 28, which carries a plurality of circumferentially spaced radially outwardly extending fan blades 30. The fan rotor 28 and fan blades 30 are enclosed by a fan casing 32, which defines a fan duct 33. The fan casing 32 is secured to the core engine casing 26 by a plurality of circumferentially spaced radially extending fan outlet guide vanes 34.

Figure 2:
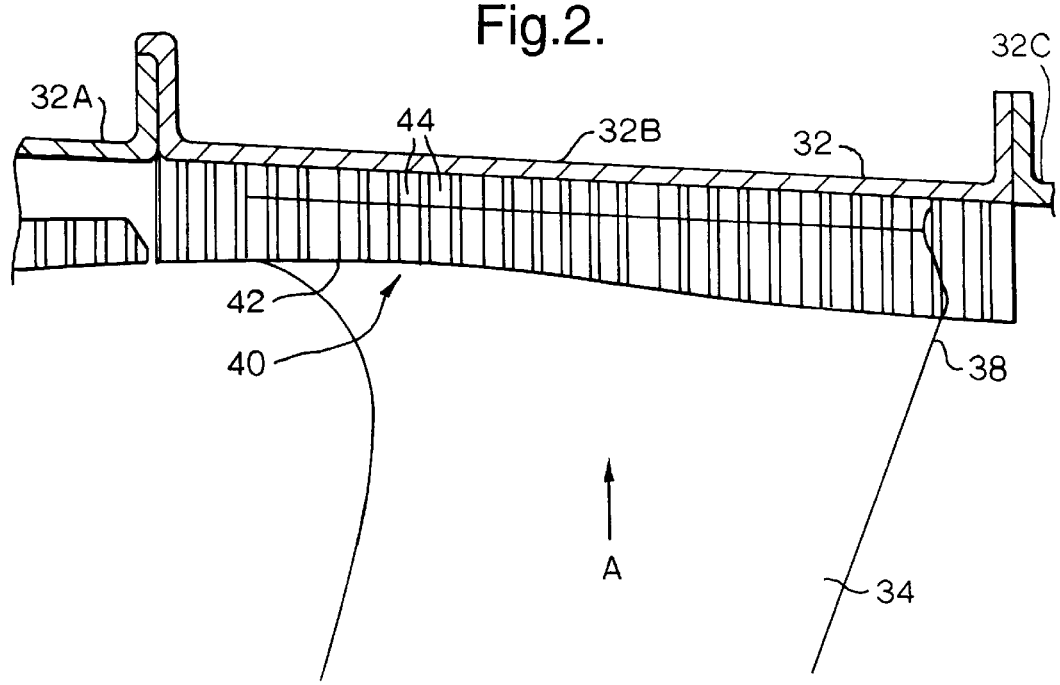
FIG. 2 is an enlarged cross-sectional view through the fan outlet guide vane assembly shown in FIG. 1.
Figure 3:
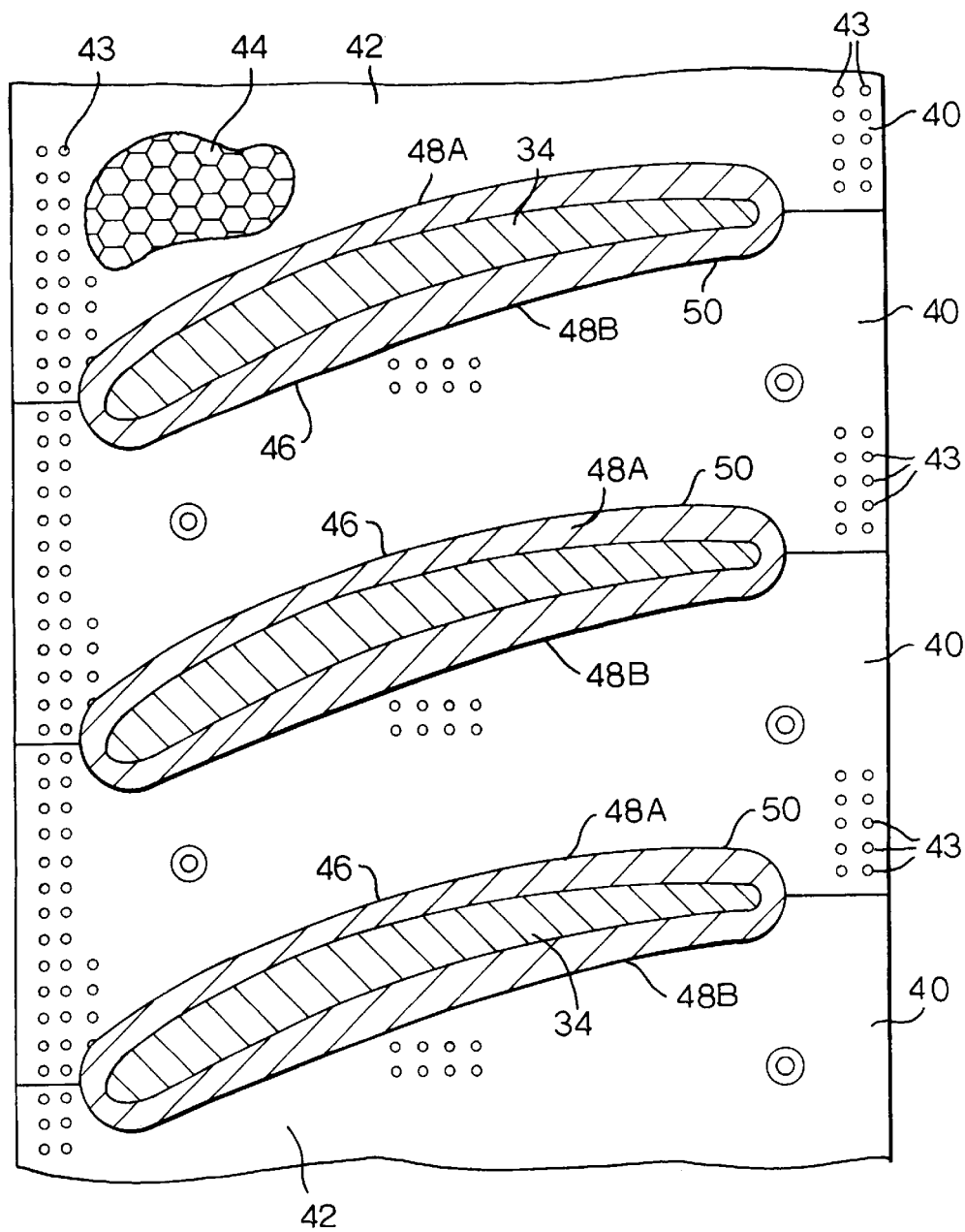
FIG. 3 is a view in the direction of arrow A in FIG. 2.

The fan casing 32 and the fan outlet guide vanes 34 form a fan outlet guide vane assembly 36, as shown more clearly in FIGS. 2 and 3. The fan casing 32 comprises a plurality of fan casing portions 32A, 32B and 32C. The fan outlet guide vanes 34 are secured at their radially outer ends 38 to the fan casing portion 32B of the fan casing 32 by fasteners, for example nuts and radially extending bolts, or by welded joints. A plurality of panels 40 are secured to the fan casing portion 32B of the fan casing 32 by fasteners, for example nuts and radially extending bolts, or by an adhesive bond and fasteners.

Each panel 40, as shown in FIG. 3, is arranged between two adjacent fan outlet guide vanes 34 to define the flow path between the fan outlet guide vanes 34. Each panel 40 comprises a perforated skin 42 and a structure 44 to form an acoustic treatment structure. The perforated skin 42 has a plurality of perforations 43. The perforated skin 42 defines the flow path between the fan outlet guide vanes 34.

The perforated skin 42 of each panel 40 comprises aluminium, titanium, and composite material, for example fibre reinforced plastic e.g. glass fibre reinforced nylon 66. The structure 44 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced nylon.

A flexible seal 46 is arranged between the circumferentially spaced axially extending edges 48 of each panel 40 and the two adjacent fan outlet guide vanes 34. The flexible seals 46 seal the gaps 50 between the circumferential edges 48A and 48B of the panels 40 and the two adjacent fan outlet guide vanes 34. The flexible seal 46 comprises a potting medium for example a polysulphide filler. In operation the perforated skin 42 of the panels 40 allows airflow between the radially inner and radially outer surfaces of the panels 40 and thus reduces the pressure difference between the radially inner and radially outer surfaces of the panels 40. Preferably the pressure difference between the radially inner and radially outer surfaces of the panels 40 is zero. This reduction in the pressure difference between the radially inner and radially outer surfaces of the panels 40 reduces the tendency of the air to try to remove the panels 40 from the fan casing 32.

In operation the perforated skin 42 and honeycomb structure 44 form an acoustic treatment structure which provides additional noise reduction for the turbofan gas turbine engine 10.

The flexible seal 46 may also damp vibrations of the fan outlet guide vanes 34 during operation of the turbofan gas turbine engine 10.

Figure 5:
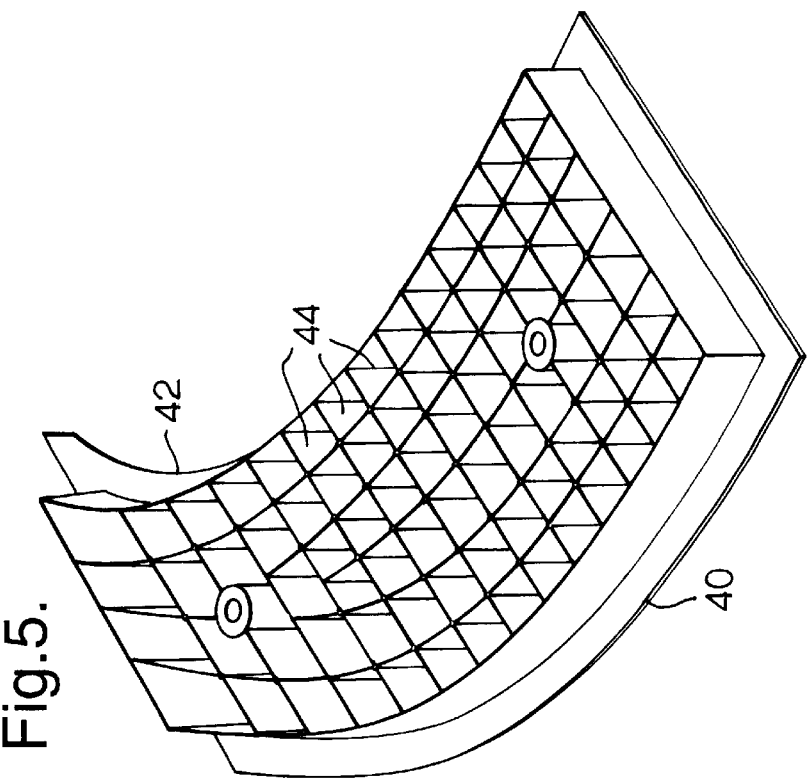
FIG. 5 is another perspective view of the outer surface of the panel shown in FIG. 4.
Figure 4:
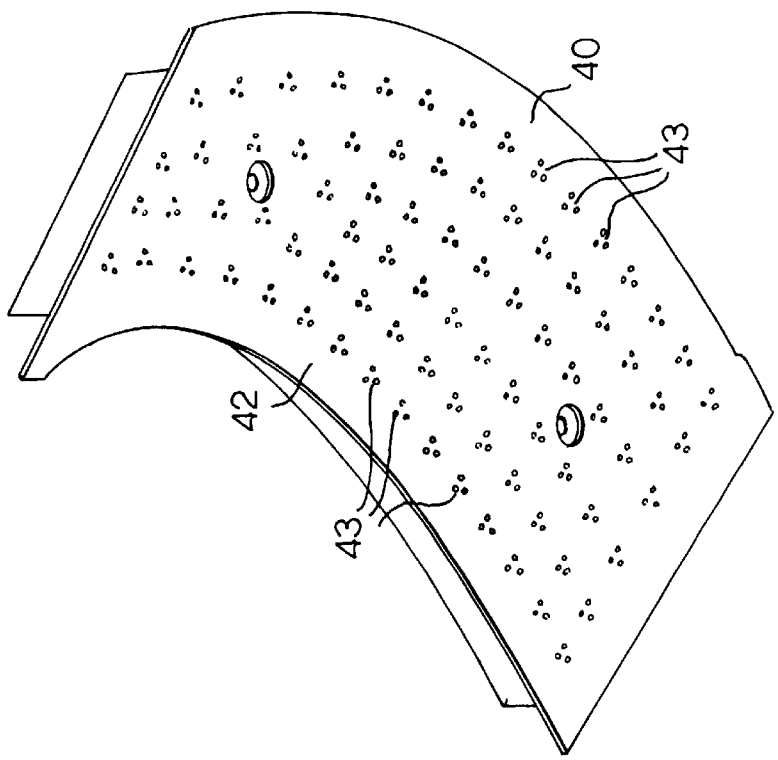
FIG. 4 is a perspective view of the inner surface of a panel.

As a further alternative, as shown in FIGS. 4 and 5, each panel 40 comprises a single piece moulding in which the perforated skin 42 and the honeycomb structure 44 are formed integrally. In this example the panel 40 comprises glass fibre reinforced nylon 66 and is formed by injection moulding. The honeycomb in this example comprises four sided cells. It is believed this embodiment is lighter in weight and easier to manufacture.

As a further alternative each panel comprises a single piece in which the perforated skin and the honeycomb structure are formed integrally. In this example the panel comprises aluminium and is formed by sintering powdered aluminium or casting aluminium. It is believed this embodiment is the lightest in weight.

It is also believed that the panels of the present invention are lighter in weight and are easier to secure to the fan casing than the prior art.

Although the present invention has been described with reference to a fan outlet guide vane assembly, the present invention is equally applicable to other guide vane assemblies in a gas turbine engine, where panels may used between the guide vanes in order to obtain a further reduction in noise. For example compressor guide vanes, turbine guide vanes etc. Of course, different materials may be used to cater for different temperatures of operation of the guide vanes, for example the perforated skin may comprise a close woven wire cloth and the honeycomb structure may comprise stainless steel.

The structure 44 to form the acoustic treatment may comprise two layers or more layers of honeycomb separated by one or more perforated skins. The radial depth of the honeycomb(s) and the properties of the perforated skin(s) are preselected for optimum noise suppression.

The honeycomb structure in FIG. 3 comprises six sided cells and the honeycomb structure in FIG. 5 comprises four sided cells. However, the present invention may comprise a honeycomb structure comprising cells with any suitable number of sides, preferably eight sides or less.

Figure 7:
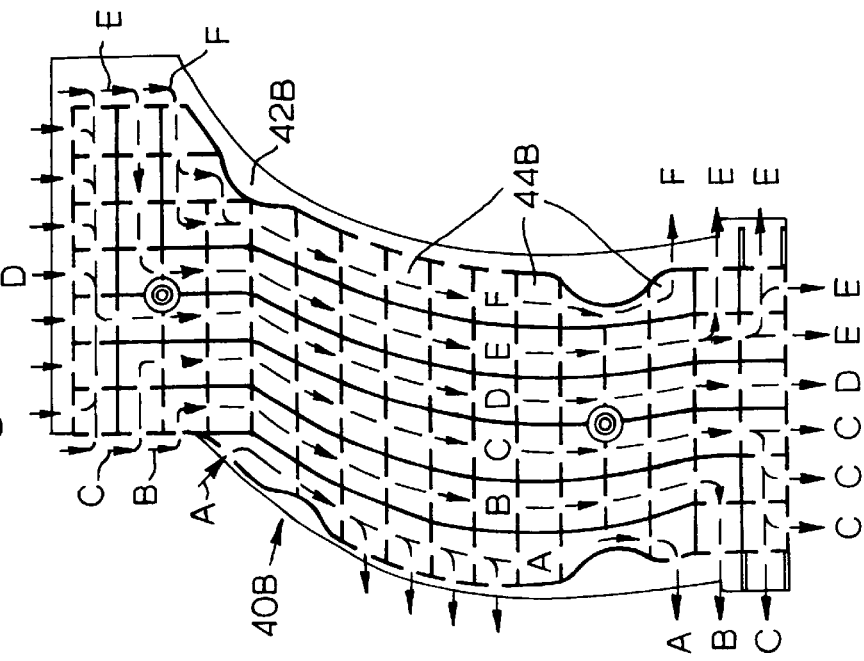
FIG. 7 is a plan view of the outer surface of the panel shown in FIG. 6.
Figure 6:
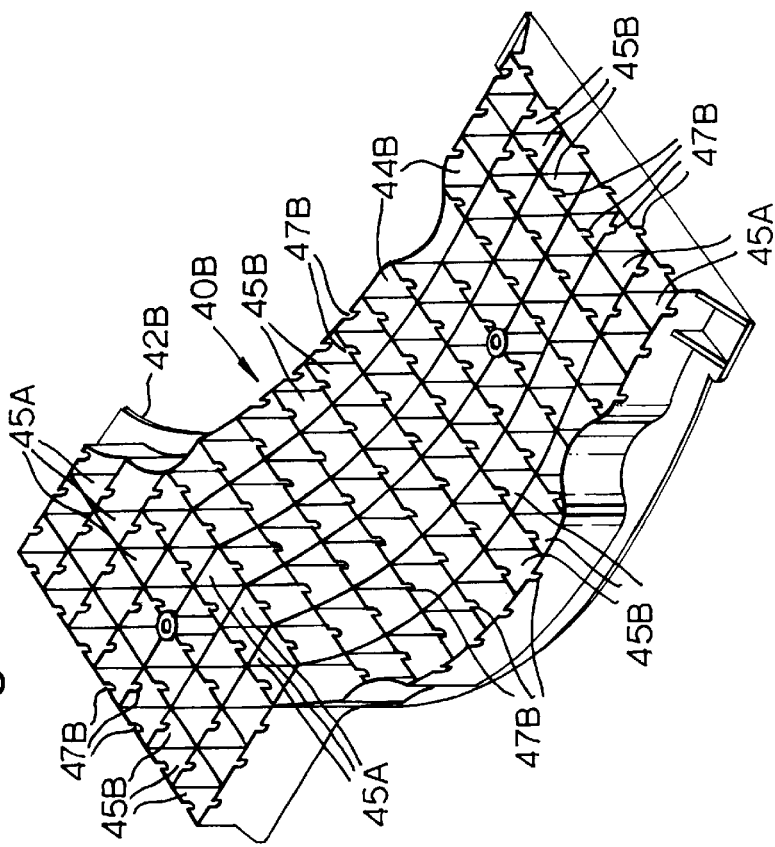
FIG. 6 is a perspective view of the outer surface of another panel.

In another alternative, as shown in FIGS. 6 and 7, each panel 40B is substantially the same as the panel 40 shown in FIGS. 4 and 5. Each panel 40B again comprises a single piece moulding in which the perforated skin 42B and the honeycomb structure 44B are formed integrally. Again in this example the panel 40B comprises glass fibre reinforced nylon 66 and is formed by injection moulding. The honeycomb in this example also comprises four sided cells. However, the embodiment in FIGS. 6 and 7 differs from that in FIGS. 4 and 5 in that the honeycomb structure 44B is provided with drainage apertures 47B in preselected walls 45B of the honeycomb structure 44B. The drainage apertures 47B are provided to allow any water and/or lubricant which collects between the panels 40B and the casing portion 32B to drain to bottom dead centre of the turbofan gas turbine engine 10 and then through the fan casing portion 32B of the fan casing 32. In particular the drainage apertures 47B are provided in preselected walls 45B of the honeycomb structure 44B so that the drainage apertures 47B are provided along isobars. This ensures that no air can flow from the pressure surface of one fan outlet guide vane 34 to the suction surface of an adjacent fan outlet guide vane 34 through the panel 40B, this prevents a loss of aerodynamic performance of the fan outlet guide vanes 34. The drainage apertures 47B are provided in the walls 45B at the end of the honeycomb structure 44B remote from the perforated skin 42B. The remaining walls 45A are not provided with apertures. The arrangement of the drainage apertures 47B and the flow paths, A, B, C, D, E and F for any water or oil are shown in FIG. 7. Thus the flow paths A, B, C, D, E and F are generally in an axial direction, thus the walls 45B and drainage apertures 47B generally allow flow in the axial direction and the walls 45A generally prevent flow in a circumferential direction between the pressure surface and suction surface of adjacent fan outlet guide vanes 34.

We claim:

1. A guide vane assembly comprising a casing, a plurality of circumferentially spaced radially extending guide vanes, the guide vanes being secured at their radially outer ends to the casing, a plurality of panels being secured to the casing, each panel being arranged between two adjacent guide vanes to define the flow path between the guide vanes, at least one panel comprising a perforated skin and an acoustic treatment structure, the perforated skin defining the flow path between the guide vanes and with each panel being located circumferentially between two adjacent guide vanes.

2. A guide vane assembly as claimed in claim 1 wherein each panel comprises a perforated skin and an acoustic treatment structure, the perforated skin defining the flow path between the guide vanes.

3. A guide vane assembly as claimed in claim 1 wherein the at least one panel is secured to the casing by fasteners or by an adhesive bond and fasteners.

4. A guide vane assembly as claimed in claim 1 wherein the perforated skin of the at least one panel comprises a composite material.

5. A guide vane assembly as claimed in claim 1 wherein the guide vanes are secured to the casing by fasteners or by welded joints.

6. A guide vane assembly as claimed in claim 1 wherein the guide vanes are fan outlet guide vanes and the casing is a fan casing.

7. A guide vane assembly as claimed in claims 1 wherein the acoustic treatment is provided with drainage apertures to allow water and/or lubricant to flow generally axially and to prevent water or/lubricant flowing generally circumferentially between the panel and the casing between the two adjacent guide vanes.

8. A guide vane assembly as claimed in claim 1 wherein the acoustic treatment structure comprises a honeycomb structure.

9. A guide vane assembly as claimed in claim 8 wherein the honeycomb structure comprises a plurality of cells, each cell having eight sides or less.

10. A guide vane assembly as claimed in claim 9 wherein the honeycomb structure comprises an aluminium honeycomb, a composite material honeycomb or other suitable honeycomb.

11. A guide vane assembly as claimed in claim 1 wherein the perforated skin and the acoustic treatment structure are integral.

12. A guide vane assembly as claimed in claim 11 wherein the perforated skin and the acoustic treatment comprises a composite material or a metal.

13. A guide vane assembly as claimed in claim 12 wherein the perforated skin and the acoustic treatment comprises aluminium or glass fibre reinforced nylon.

14. A guide vane assembly comprising a casing, a plurality of circumferentially spaced radially extending guide vanes, the guide vanes being secured at their radially outer ends to the casing, a plurality of panels being secured to the casing, each panel being arranged between two adjacent guide vanes to define the flow path between the guide vanes, at least one panel comprising a perforated skin and an acoustic treatment structure, the perforated skin defining the flow path between the guide vanes wherein a flexible seal is arranged between the circumferential edges of the at least one panel and the two adjacent fan outlet guide vanes to seal the gaps between the circumferential edges of the at least one panel and the two adjacent fan outlet guide vanes.

* * * * *